United States Patent [19]

Deffeyes et al.

[11] 4,160,284
[45] Jul. 3, 1979

[54] CAPACITORS AND PROCESS FOR MAKING SAME

[75] Inventors: Robert J. Deffeyes, Arlington; Harris W. Armstrong, Fort Worth, both of Tex.

[73] Assignee: Graham Magnetics, Inc., Graham, Tex.

[21] Appl. No.: 819,362

[22] Filed: Jul. 27, 1977

[51] Int. Cl.$^2$ .............................................. H01G 9/00
[52] U.S. Cl. .................................... 361/433; 29/570; 427/80
[58] Field of Search ......................... 361/433; 29/570; 427/80, 81

[56] References Cited

U.S. PATENT DOCUMENTS 2,299,228  10/1942  Gray et al. ........................... 361/433

Primary Examiner—James W. Davie
Attorney, Agent, or Firm—Cesari and McKenna

[57] ABSTRACT

An improved capacitor, especially of the tantalum capacitor type, wherein a very small particle silver metal powder is impregnated into a porous metal anode member, say of tantalum. The resulting capacitor has a much reduced resistance in the non-dielectric components of the capacitor without any substantial decrease in the desirably-high reistance across the dielectric component of the capacitor. The process of forming such a capacitor is relatively inexpensive and allows one to avoid a number of manufacturing steps and reduce the manufacturing cost of the improved capacitor even though it contains a relatively large amount of silver metal.

12 Claims, 3 Drawing Figures

CAPACITORS AND PROCESS FOR MAKING SAME

BACKGROUND OF THE INVENTION

This invention relates to capacitors formed of tantalum or the like, and especially to tantalum capacitors of the type wherein the anode is tantalum metal, an insulating compound such as tantalum oxide acts as the dielectric and, in a common arrangement, a conductive package in which the tantalum oxide is carried acts as the cathode. Such capacitors are generally described in a number of patents, including:

U.S. Pat. No. 3,585,027
U.S. Pat. No. 3,553,805
U.S. Pat. No. 3,600,796
U.S. Pat. No. 3,585,072
U.S. Pat. No. 3,653,119

In general, the manufacturing processes for such tantalum capacitors are rather complex. For example, in a typical process, an anode is made by forming, around a tantalum wire, a plug of pressed tantalum powder; sintering the plug into a porous metal part; converting the surface of the tantalum to tantalum oxide; soaking the plug with $Mn(NO_3)_2$ solution; heating and drying thereof; again treating the surface of the plug to assure any metal is oxidized. The oxidized layer of tantalum may be considered the dielectric member of the capacitor. The tantalum is the anode and maganese dioxide is believed to form part of the cathode.

Thereupon, the tantalum oxide-coated plug described above is soaked in, i.e. impregnated with, a liquid dispersion of ultra-small particles of conductive carbon. After drying, the carbon-soaking step is repeated. Thereupon the part is dipped into a silver paint such as that sold by DuPont under the trade designation 8079 silver paint. After dipping, the part is usually dried and dipped once again. The silver paint serves as a solderable conductor.

The silver-coated device described above is slid into a can. Usually the can contains a disc of solder metal therein, and heat is used to melt the solder, thereby assuring good electrical connection between the silver paint forming part of the cathode on the tantalum capacitor and the can itself. An anode lead runs from the tantalum wire which was only partly embedded in the porous plug; a cathode lead runs from the metal can which has now been incorporated into the "cathode side" of the capacitor.

Alternately, the silver-coated device is wetted with solder; a cathode lead being soldered to the device during the soldering process; and then the device is encapsulated within an organic resin, usually an epoxy. The cathode and anode leads are, of course, left exposed.

Satisfactory capacitors were made by such a process as described above, but it was most desirable to (1) improve their electronic characteristics and/or (2) provide a relatively inexpensive way for manufacturing such devices.

Consequently, it is an objective of the Applicant's invention to achieve both of these advantages, and preferably, to do so simultaneously by providing both an improved capacitor product and an improved process for making the product.

SUMMARY OF THE INVENTION

The above objects have been substantially achieved by utilizing a paste comprising an ultra-small silver pigment to replace the conductive carbon as the solid component in the prior art, i.e. the art relating to the formation of capacitors by oxidizing a porous plug or pellet of a metal to form a dielectric surface and impregnating the plug with a conductive material. This change allows an improved manufacturing process and it also provides a means to very substantially improve the electrical characteristics of the capacitor by reducing the resistance of the non-dielectric components of the capacitor to a small fraction of the resistance required of carbon-bearing capacitors.

The term "porous" as used herein characterizes a mass which contains a multitude of small pores. The term does not require that the mass have porosity in the sense of being permeable to air or some other fluid.

In order to practice the invention successfully, it is necessary to use a metallic-powder-paint, advantageously, a silver paint, which is characterized by a silver powder having a sub-micron average diameter, preferably an average diameter of less than 0.5 micron and most advantageously between about 0.1 and 0.25 micron. The viscosity of the paste is desirably 300 cps (centipoises) or less and it conventionally contains from 40% to 45% of silver by weight based on the total weight of the paste (or an equivalent volume of another conductive metal).

It is to be particularly noted that the silver pastes which have heretofor been used for external coating of the capacitor plugs by tantalum capacitor makers do not appear to be useful in the impregnation step which characterizes the invention.

In the process of the invention, it has been found particularly valuable, that multi-impregnations of the porous capacitor core can be avoided. Excellent results are achieved with a single impregnating step. Moreover, a single coat of conventional conductive paint on the exterior of the impregnated plug is also found to be wholly satisfactory; thus, there is a substantial saving in forming a product with fewer manipulative steps. Also, drying time is avoided, as after the first coating of exterior silver and process time is substantially reduced.

Among other metal powders which can be used to form a useful impregnating composition are nickel, iron and cobalt powders — all of which can be readily formed in appropriately small sizes by reducing the salts of carboxylic acids such as oxalic acid. Mixtures of such powders or alloys formed by reduction of mixed salts can also be used. The electroconductive nature of these metal particles can be enhanced by the use of thin electroconductive carbide surface treatments. Aluminum powder can also be used in the process of the invention; however, care should be taken to avoid formation of insulating coatings thereon. Gold powder would also be useful were it available in sufficiently small particle size.

Those skilled in the art will be able to select other electroconductive metal powders for use in the invention.

In any event, silver powders are preferred, particularly silver powder having a shape characteristic of powders which are formed by thermal decomposition of a salt of silver and a carboyxlic acid, e.g. such as silver oxalate.

ILLUSTRATIVE EXAMPLE OF THE INVENTION

MAKING A SUITABLE SILVER IMPREGNATING PAINT

The following 2 solutions are formed:
(1) an aqueous solution of 170 grams of silver nitrate in one liter of deionized water.
(2) an aqueous solution of 140 grams of oxalic acid in a liter of deionized water.

These two solutions are mixed together by adding the oxalic acid solution to the nitrate solution in a baffled Erlenmeyer flask while agitating the mixture vigorously. When so combined, the silver nitrate and oxalic acid react to form small silver oxalate particles of about one micron in average diameter.

The silver oxalate is separated from the remaining liquid by filtering or decanting, and then washed and dried with acetone.

Thereupon a quantity of 10 grams of the dry silver oxalate is slurried in a quantity of 90 grams pine oil and heated slowly to the thermal decomposition temperature of the oxalate. This decomposition takes place at or below the boiling point of the pine oil (alpha terpinol, i.e. $C_{12}H_{17}OH$) and results in a dispersion of very fine silver powder in the pine oil-based liquid medium.

The silver powder is separated from the pine oil and then filtered, and washed and dried with acetone. The powder has an average diameter of about 0.25 micron.

The resulting silver is formed into an impregnating composition for use in capacitors as follows:

A quantity of 18 grams of silver powder is mixed with (a) 3.3 grams of a resin solution formed of 61% of a polyester resin (sold by DuPont under the trade designation "49000") in methoxyacetone; (b) 3 drops of a flow-control agent sold under the trade designation FC-430 by 3M Co.; and (c) 7.5 grams of methoxyacetone. This mixture is processed on a shaker mill until it is uniform. The mixture, having a viscosity of about 300 cps is then ready for use in capacitor manufacture.

Forming the Capacitor

EXAMPLE 1

Figure 1:
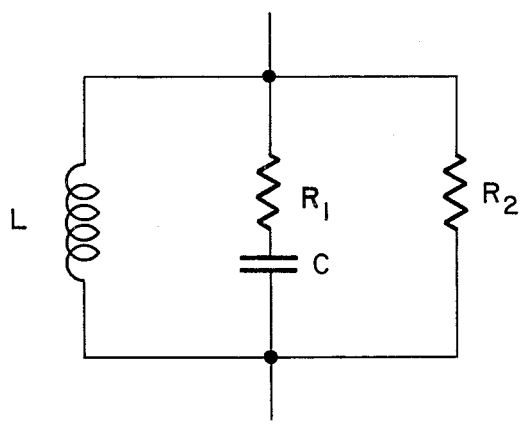
FIG. 1 illustrates, schematically, the electrical characteristics of a tantalum capacitor.
Figure 2:
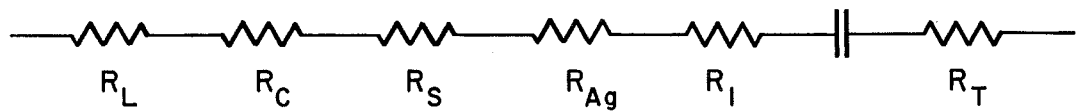
FIG. 2 illustrates schematically the resistivity of a tantalum capacitor constructed according to the prior art.
Figure 3:
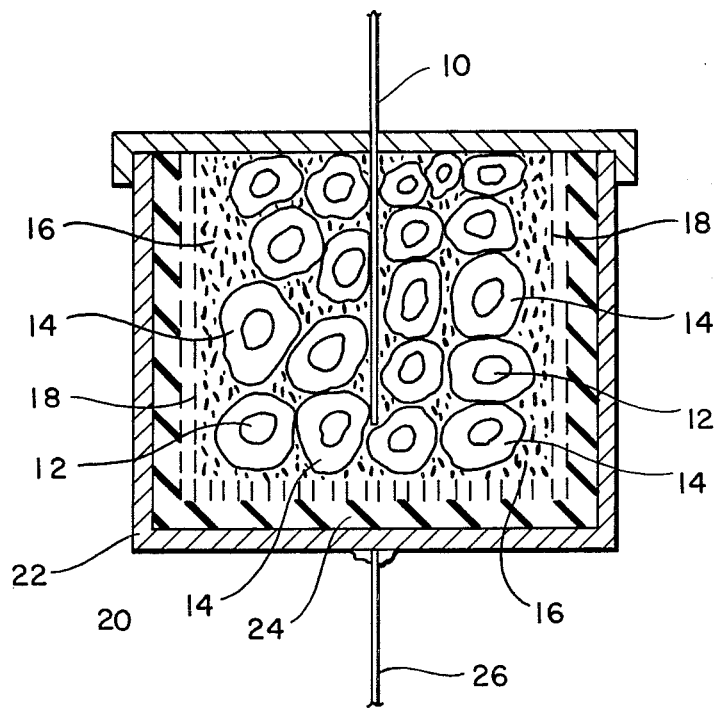
FIG. 3 illustrates schematically an improved tantalum capacitor product of the present invention.

The following description is made with reference to FIG. 1 through FIG. 3.

Tantalum wire 10 is placed within a mass of tantalum powder 12. The powder 12 is sintered into a porous plug around, and in intimate contact with wire 10.

Thereupon a dielectric layer of tantalum oxide 14, presumably tantalum pentoxide, is formed on the exposed surfaces of the porous plug, preferably by an electrolytic process. Subsequently, the still-porous plug is soaked in $Mn(NO_3)_2$ and then heated. A semiconductive $MnO_2$ coating forms over the tantalum oxide and tends to heal any imperfection in the tantalum oxide layer.

Next, the oxide-covered plug is soaked in the silver paint described above. Small particles of silver 16 fill voids between the porous oxide-coated, plug material. The plug is cured after each impregnation step to convert the conductive silver paste to a solid impregnant wherein the silver powder is in particle-to-particle contact and, thereby, forms an electroconductive mass.

The resultant part can be painted with a conventional, silver paint, e.g. that is sold by DuPont under the trade designation DuPont 8079, to form a solderable conductor 18 which will aid soldering of the plug 20 of silver-impregnated, oxide-coated, tantalum to a can 22 using a conventional solder 24. A cathode lead wire 26 is attached to can 24.

EXAMPLE 2

The process of Example 1 is repeated wherein, instead of an oxidized tantalum powder, an anodically-oxidized aluminum powder is compressed into the plug to be treated with manganese nitrate.

The resulting capacitor exhibits the same beneficial characteristics constructed by the silver powder as does the tantalum capacitor of Example 1.

EXAMPLE 3

The process of Example 1 is repreated wherein, instead of an oxidized tantalum powder, an anodically-oxidized titanium powder is compressed into the plug to be treated with manganese nitrate.

The resulting capacitor exhibits the same beneficial characteristics constructed by the silver powder as does the tantalum capacitor of Example 1.

EXAMPLE 4

The process of Example 1 is repeated wherein, instead of an oxidized tantalum powder, an anodically-oxidized titanium powder is compressed into the plug to be treated with manganese nitrate.

The resulting capacitor exhibits the same beneficial characteristics constructed by the silver powder as does the tantalum capacitor of Example 1.

EXAMPLE 5

The process of Example 1 is repeated excepting that the impregnating paste is formed of a nickel powder having an average diameter of 0.3 microns. The resulting capacitor exhibits superior properties in terms of dissipation of thermal energy and usefulness at higher frequencies than do graphite-impregnated capacitors.

EXAMPLE 6

The process of Example 1 is repeated excepting that the impregnating paste is formed of a aluminum powder having an average diameter of 0.5 microns. The resulting capacitor exhibits superior properties in terms of dissipation of thermal energy and usefulness at higher frequencies than do graphite-impregnated capacitors.

It should be noted that, in a typical prior art article as defined in FIG. 1, resistances would be of the following approximate relative magnitudes:

$R_L$ — 0.000007
$R_C$ — 0.000002
$R_S$ — 0.00005
$R_{AQ}$ — 0.005
$R_I$ — 0.20 if graphite; 0.000003 if silver
$R_T$ — 0.000013
$R_1$ — 0.000007

When the impregnant is silver, the resistance $R_I$ becomes negligible. It is immediately apparent that the substitution of silver for graphite renders a superior capacitor, one which will have a far superior dissipation factor and, moreover, one which will be able to dissipate thermal energy faster in any application where heat dissipation is required. Thus, the tantalum capacitors of the invention are useful at higher frequencies if such frequencies are of interest to a given designer. If not, the capacitor of the invention can sustain a given capacitive performance in a smaller device than could devices known to the prior art.

It is also to be understood that the following claims are intended to cover all of the generic and specific features of the invention herein described and all statements of the scope of the invention which might be said to fall therebetween.

What is claimed is:

1. A capacitor of the type comprising a porous mass of dielectric oxide-coated metal between an anode and a cathode, said oxide forming the dielectric of said capacitor, the improvement wherein said porous mass is impregnated with an electroconductive metal powder-containing paste, said powder having an average diameter of less than about 1 micron.

2. A capacitor as defined in claim 1 wherein said powder is silver powder.

3. A capacitor as defined in claim 2 wherein said silver powder has an average diameter of from 0.1 to 0.3 micron.

4. A capacitor as defined in claim 2 wherein said dielectric oxide-coated metal is tantalum.

5. A capacitor as defined in claim 3 wherein said oxide-coated metal powder is tantalum and wherein said dielectric oxide is tantalum oxide.

6. A capacitor as defined in claim 1 wherein said metal powder has an average diameter of from 0.1 to 0.3 micron.

7. A capacitor as defined in claim 2 wherein said dielectric oxide-coated metal is aluminum.

8. A capacitor as defined in claim 3 wherein said dielectric oxide-coated metal is aluminum.

9. In a process for making a capacitor which process includes the steps of impregnating an electroconductive paste into a porous mass of metal having a dielectric oxidized material coated thereon; the improvement comprising the step of impregnating said porous mass with an electroconductive paste which comprises, as its primary solid constituent, electroconductive metal particles of less than one micron in average diameter.

10. A process as defined in claim 7 wherein said metal particles are of less than one micron in average diameter and are silver particles; wherein the impregnation is carried out in a single step and wherein the viscosity of the impregnating paste is below 3000 centipoises during the impregnation step, and wherein the average diameter of the silver particles is about 0.3 microns.

11. A process as defined in claim 9 wherein said porous mass is formed of tantalum.

12. A process as defined in claim 10 wherein said porous mass is formed of tantalum.

* * * * *